United States Patent
Tokunaga (10) Patent No.: US 9,817,618 B2
(45) Date of Patent: Nov. 14, 2017

(54) IMAGE FORMING SYSTEM, IMAGE FORMING DEVICE, MOBILE COMMUNICATION TERMINAL, AND RELAY SERVER

(71) Applicant: KYOCERA Document Solutions Inc., Osaka (JP)

(72) Inventor: Tomoharu Tokunaga, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 15/510,615

(22) PCT Filed: Sep. 10, 2015

(86) PCT No.: PCT/JP2015/075667
§ 371 (c)(1),
(2) Date: Mar. 10, 2017

(87) PCT Pub. No.: WO2016/039401
PCT Pub. Date: Mar. 17, 2016

(65) Prior Publication Data
US 2017/0262234 A1    Sep. 14, 2017

(30) Foreign Application Priority Data
Sep. 10, 2014    (JP) ................................ 2014-184447

(51) Int. Cl.
*G06F 3/12* (2006.01)
*H04N 1/00* (2006.01)
(52) U.S. Cl.
CPC .......... *G06F 3/1236* (2013.01); *G06F 3/1203* (2013.01); *G06F 3/1286* (2013.01);
(Continued)

(58) Field of Classification Search
None
See application file for complete search history.

(56) References Cited

U.S. PATENT DOCUMENTS 7,283,820 B2* 10/2007 Kamijo ............... H04L 63/0272
379/161
7,839,517 B1* 11/2010 Kinjo ....................... G06F 3/14
358/1.15

(Continued)

FOREIGN PATENT DOCUMENTS

JP    2000-032203 A    1/2000
JP    2013-250940 A    12/2013

*Primary Examiner* — Ted Barnes
(74) *Attorney, Agent, or Firm* — Hawaii Patent Services; Nathaniel K. Fedde; Kenton N. Fedde (57) ABSTRACT

To provide an image forming system, an image forming device, a mobile communication terminal, and a relay server, all of which are interrelated to each other such that the mobile communication terminal is capable of remotely controlling the image forming device without having to conduct a confirmation of the image forming device. When a user changes a setting value through a setting value operation screen that appears on an operation panel, the mobile communication terminal transmits a setting value change demand notification including the changing setting value to the relay server. The relay server compares the preceding setting value to a setting value of the image forming device that the relay server stores currently to detect a setting value of the image forming device which is to be rewritten. The relay server rewrites the resulting setting value.

6 Claims, 5 Drawing Sheets

(52) U.S. Cl.
    CPC ....... *G06F 3/1292* (2013.01); *H04N 1/00244* (2013.01); *H04N 1/00307* (2013.01); *H04N 1/00408* (2013.01); *H04N 2201/0094* (2013.01)

(56) References Cited

U.S. PATENT DOCUMENTS

| | | | | |
|---|---|---|---|---|
| 2010/0190490 A1* | 7/2010 | Karancheti | ........... | H04W 8/205 455/426.1 |
| 2014/0268236 A1* | 9/2014 | Ohara | ................... | G06F 3/1224 358/1.15 |
| 2014/0368867 A1* | 12/2014 | Kim | ...................... | G06F 3/1204 358/1.15 |
| 2015/0281500 A1* | 10/2015 | Mori | .................. | H04N 1/00928 358/1.15 |

* cited by examiner

IMAGE FORMING SYSTEM, IMAGE FORMING DEVICE, MOBILE COMMUNICATION TERMINAL, AND RELAY SERVER

TECHNICAL FIELD

The present invention relates to an image forming system, an image forming device, a mobile communication terminal, and a relay server, all of which are interrelated to each other such that the mobile communication terminal on which is mounted a function that is capable of remotely controlling the image forming apparatus is configured to remotely control, via the relay server, the image forming apparatus.

BACKGROUND

An image forming device, such as a printer or an MFP (Multifunction Peripheral) is configured to conduct operations that include changing and confirming of operation modes such as high speed and low speed operation modes, changing and confirming a setting value such as a resolution that is set when a manuscript is changed into an image, confirming a malfunction condition, and executing jobs such as copying and facsimile transmission.

In addition, there has been provided a function (hereinafter which is referred as a "remote panel function") that allows mobile communication terminals that include, for example, a cellular phone, a smart phone, and a tablet terminal, to indicate a content of screen of an operation panel of the image forming device for enabling a remote control of the image forming device from the mobile communication terminal. In this way, enabling the operation of the image forming device from the mobile communication terminal on which is mounted the remote panel function will allow a user to operate the image forming device even when another user conducts an operation of the operation panel of the image forming device.

For example, the image forming device of the Patent literature 1 is configured to receive settings related to a job to be executed, receive a first operation when the settings are received, and transmit, to the mobile communication terminal, when the first operation is received, information to be displayed on a screen of a touch panel of the mobile communication terminal and contents of the received settings. The mobile communication terminal causes the touch panel to display a screen based on the received information to receive contents with which the contents of the settings are changed. The mobile communication terminal transmits the received and changed contents to the image forming device. The image forming device reflects the received and changed contents on the settings related to a job to be executed.

PRIOR ART DOCUMENT

Patent Literature

Patent Literature 1: Japanese Patent Laid-open Print No. 2013-157848 (JP 2013-157848 A1)

SUMMARY OF THE INVENTION

Problem to be Solved by the Invention

However, in Patent Literature 1, there is a problem of disablement of changing the settings in a case where the communication between the image forming device and the mobile communication terminal come to be in a difficult condition or in a case where the image forming device is in a different condition from usual, the different condition being, for example, in a rebooting condition, a high load condition, and a maintenance condition.

In view of the above circumstances, the present invention is made in order to provide an image forming system, an image forming device, a mobile communication terminal, and a rely server, each of which is capable of overcoming the aforementioned problem.

Means for Solving the Problem

An image forming system of the present is featured to include:
a mobile communication terminal;
an image forming device; and a relay server, the mobile communication terminal including a remote operation demand notification transmission part that is configured to transmits a remote operation demand notification to the image forming device, a relay server information receiving part that is configured to receive relay server information in which an address of the relay server is stored from the image forming device, and a setting value change demand notification transmission part that is configured to transmit a setting value change demand notification including a changed setting value to the relay server, the image forming device including a setting value data transmission part that is configured to transmit setting value data including a setting value of the image forming device to the relay server, a remote operation demand notification receiving part that is configured to receive the remote operation demand notification from the mobile communication terminal, and a relay server information transmission part that is configured to transmit the relay server information to the mobile communication terminal, the relay server including a setting value data receiving part that is configured to receive the setting value data from the image forming device, a setting value change demand notification part that is configured to receive the setting value change demand notification from the mobile communication terminal, a rewritten setting value detection part that is configured to detect a rewritten setting value based on the setting value data and the changed setting value, and a setting value rewriting part that is configure to rewrite a setting value of the image forming apparatus based on the rewritten setting value, the relay server causing the setting value rewriting part to rewrite the setting value of the image forming device.

An image forming system of the present invention is featured to include: a mobile communication terminal; an image forming device; and a relay server, the mobile communication terminal including a remote operation demand notification transmission part that is configured to transmits a remote operation demand notification to the image forming device, a relay server information receiving part that is configured to receive relay server information in which an address of the relay server is stored from the image forming device, and a setting value change demand notification transmission part that is configured to transmit a setting value change demand notification including a changed setting value to the relay server, the image forming device including a remote operation demand notification receiving portion that is configured to receive the remote operation demand notification from the mobile communication terminal, a relay server information transmission part that is configured to transmit the relay server information to the mobile communication terminal, an alert mode setting transmission part that is configured to transmit a signal for setting an alert mode to the relay server, and an alert mode resetting transmission part that is configured to transmit a signal for resetting the alert mode to the relay server, the relay server including an alert mode setting receiving part that is configured to receive the signal for setting an alert mode from the image forming device, a setting value data extracting part that is configured to extract, when the alert mode set receiving part receives the signal for setting the alert mode, setting value data in which a setting value is stored from the image forming device, a setting value change demand notification receiving part that is configured to receive the setting value change demand notification from the mobile communication terminal, a setting value overriding part that is configured to override the changed setting value to the setting value data that is extracted by the setting value data extracting part, an alert mode reset receiving part that is configured to receive the signal for resetting the alert mode from the image forming device, and an image forming device setting value overriding part that is configured to override the setting value data that is overridden by the setting value overriding part to the setting value data of the image forming device, the relay server causing the setting value overriding part to override the setting value of the image forming device when the alert mode reset receiving part receives the signal for resetting the alert mode.

An image forming device of the present invention is featured to include: a setting value data transmission part that is configured to transmit setting value data that stores a setting value of an image forming device to a relay server; a remote operation demand notification receiving part that is configured to receive a remote operation demand notification from a mobile communication terminal; and a relay server information transmission part that is configured to transmit a relay server information that stores an address of the relay server to the mobile communication terminal, and the relay server being configured to rewrite the setting value data of the image forming device.

In addition, the image forming device of the present invention is featured to include a proxy response mode setting part that is configured to set a proxy response mode to either ON or OFF, wherein when the proxy response mode is ON, the relay server rewrites the setting value data of the image forming device.

An image forming device of the present invention is featured to include, a remote operation demand notification receiving part that is configured to receive a remote operation demand notification from a mobile communication terminal, a relay server information transmission part that is configured to transmit relay server information to the mobile communication terminal, an alert mode set transmission part that is configured to transmit a set signal for setting an alert mode to the relay server, and an alert mode reset transmission part that is configured to transmit a signal for resetting an alert mode to the relay server, the relay server being configured to rewrite the setting value data of the image forming device when the relay server receives the signal for resetting the alert mode.

A relay server of the present invention is featured to include: an alert mode set receiving part that is configured to receive a set signal for setting an alert mode from an image forming device; a setting value data extracting part that is configured to extract, when the alert mode set receiving part receives the signal for setting the alert mode, setting value data in which a setting value is stored from the image forming device; a setting value change demand notification receiving part that is configured to receive the setting value change demand notification in which a changed setting value is stored from the mobile communication terminal; a setting value overriding part that is configured to override the changed setting value to the setting value data that is extracted by the setting value data extracting part; an alert mode reset receiving part that is configured to receive the signal for resetting the alert mode from the image forming device; and an image forming device setting value overriding part that is configured to override the setting value data that is overridden by the setting value overriding part to the setting value data of the image forming device, the relay server causing the image forming device setting value overriding part to override the setting value of the image forming device when the alert mode reset receiving part receives the signal for resetting the alert mode.

Effects of the Invention

The present invention, which is embodied in an image forming system, an image forming device, a mobile communication terminal, and a relay server, will enable the mobile communication terminal to conduct a remote control operation to the image forming device without having to conduct a confirmation of the image forming device.

MODES FOR CARRYING OUT THE INVENTION

Hereinbelow, an exemplary embodiment 1 of the present invention will be described with reference to the attached drawings. In the exemplary embodiment 1, in a case where a setting value of the image forming device is changed from the mobile communication terminal and concurrently the mode of a proxy response is ON that is conducted via a relay server, if a communication between the mobile communication terminal and the image forming device comes to be difficult for whatever reason, a setting value that the mobile communication terminal changes is caused to be transmitted to the relay server. In addition, the communication between the mobile communication terminal and the image forming device recovers to a normal condition, the relay server rewrites a setting value of the image forming device to the value that is changed by the mobile communication terminal. It is to be noted that the proxy response mode is made automatically ON when an operation panel of the image forming device is in use, while is made automatically OFF when the operation panel of the image forming device is out of use. Further, it is also to be noted that a user's manual setting makes it possible to bring the proxy response mode into either ON or OFF.

Figure 1:
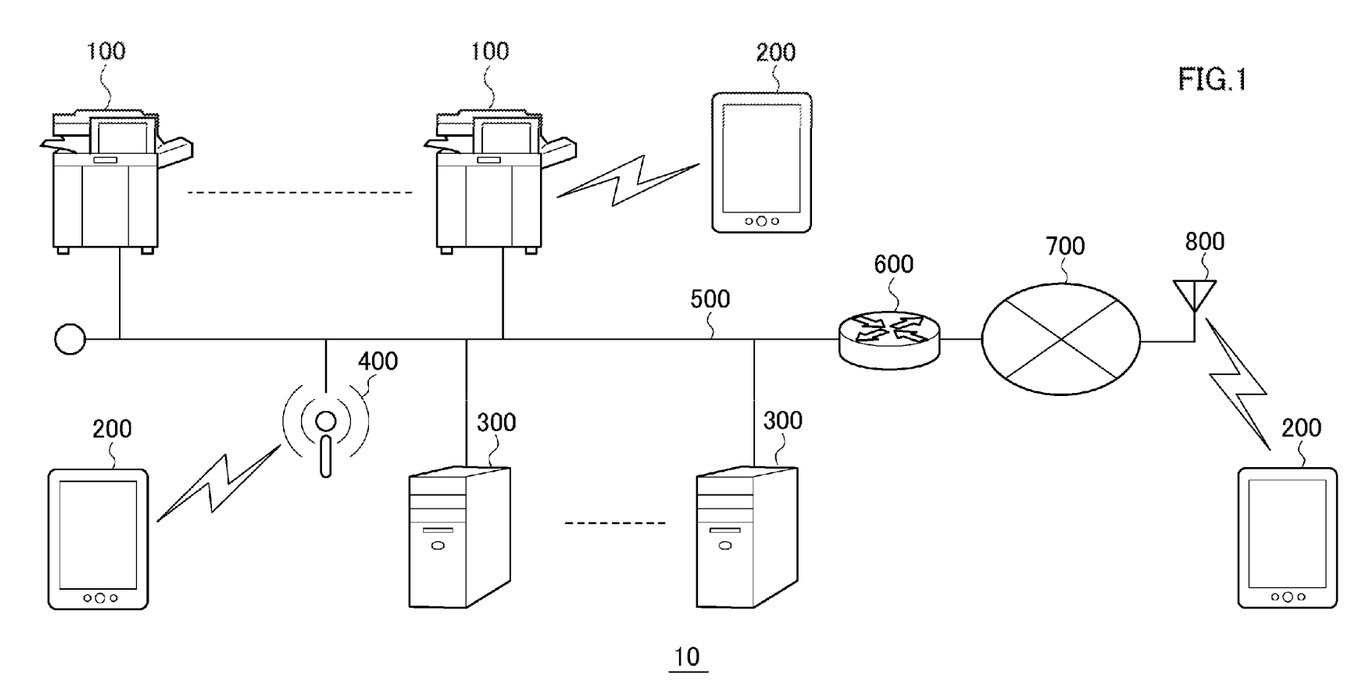
FIG. 1 is a view that illustrates a configuration of an image forming system according to an exemplary embodiment 1 of the present invention.

First of all, with reference to FIG. 1, a description will be made as to a system configuration of an image forming system 10 of the exemplary embodiment 1. As shown in FIG. 1, the image forming system 10 is made up of a plurality of image forming devices 100, a plurality of mobile communication terminals 200, a plurality of relay servers 300, an access point 400, a network 500, a router 600, an internet protocol network system 700, and an access point 800. The image forming devices 100, relay servers 300, and the access point 400 are connected the network 500 and the network 500 is connected, via the router 600, to the Internet protocol network system 700.

The image forming device 100 is in the form of, for example, a printer or a multifunction peripheral. The image forming device 100 is configured to be capable of transmitting and receiving data to and from, respectively, the mobile communication terminal 200 via a short-range radio communication system, the access point 400, or the internet protocol network system 700. In addition, The image forming device 100 is capable of the transmitting and receiving data to and from the relay server 300 via the network 500.

The mobile communication terminal 200 is in the form of, for example, a cellar phone, a smart phone, or a tablet terminal. The mobile communication terminal 200 is capable of transmitting and receiving data to and from the image forming device 100, respectively, via the short-range radio communication system, the access point 400 of the network 500, or the access point 800 of the internet protocol network system 700. In addition, the mobile communication terminal 200 is capable of transmitting and receiving data to and from the relay server 300, respectively, via the access point 400 of the network 500, or the access point 800 of the internet protocol network system 700.

The relay server 300 is capable of transmitting and receiving data to and from both the image forming device 100 and the mobile communication terminal 200, respectively, via the network 500.

The access point 400, which is connected to the network 500, enables the mobile communication terminal 200 to connect the network 500 which requests the access point 400 to be connected by wireless.

The network 500 is a network (intranet or the like) such as a LAN (Local Area Network) and is connected with the plural image forming devices 100, the plural relay servers 300, and the access point 400.

The router 600, which is connected to the network 500, causes the network 500 to connect to the internet protocol network system 700.

The internet protocol network system. 700, which is in the form of an IP network such as the Internet or the intranet, is connected with the plural mobile communication terminals 200 via the access point 800.

Figure 2:
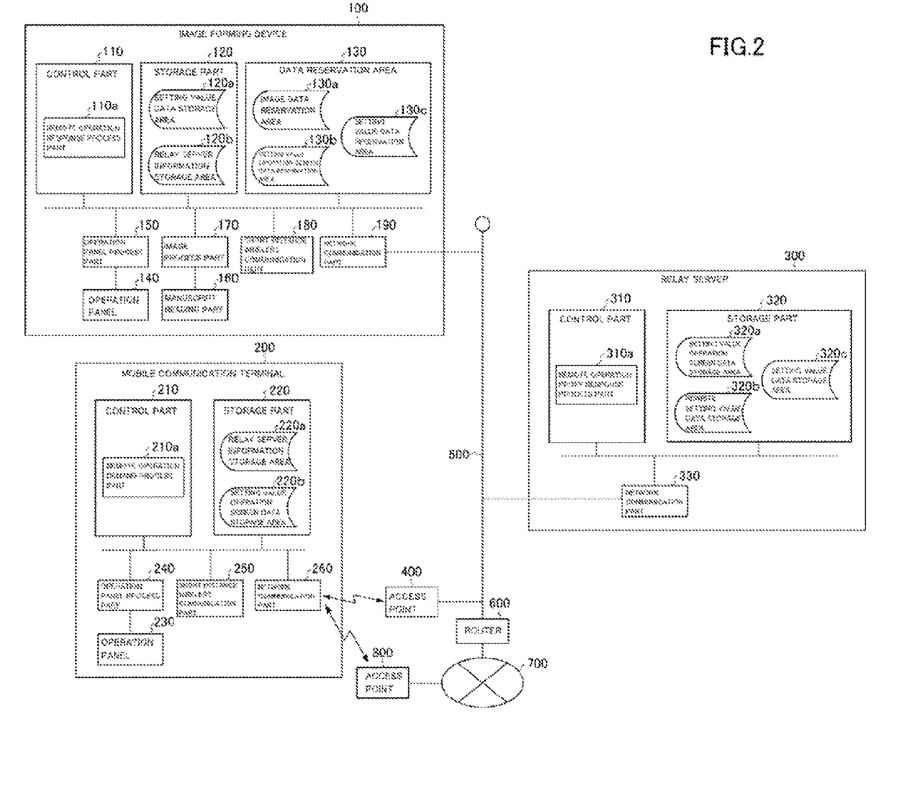
FIG. 2 is a view that illustrates functional configurations of an image forming device, a mobile communication terminal, and a relay server of the image forming system that is shown in FIG. 1.

Next, with reference to FIG. 2, a description will be made as to functional configurations of the image forming device 100, the mobile communication terminal 200, and the relay server 300 of the image forming system 10. The image forming device 100, the mobile communication terminal 200, and the relay server 300 that are shown in FIG. 2 are for illustrating, their functional configurations of, respectively, one of the image forming devices 100 connected to the network 500, one of the mobile communication terminals 200 connected to the network 500 via the access point 400, and one of the relay servers 300 connected to the network 500 in the image forming system 10 shown in FIG. 1. It is to be noted that the other image forming device 100, mobile communication terminal 200, and relay server 300 have similar functional configurations.

Firstly, a description will be made as to a functional configuration of the image forming device 100. The image forming device 100, as shown in FIG. 2, has a configuration that includes a control part 110, a storage part 120, a data reservation part 130, an operation panel 140, an operation panel process part 150, a manuscript reading part 160, an image processing part 170, a short-distance radio communication part 180, and a network communication part 190, which are connected to each other via a bus line or the like. The control part 110 is provided with a remote operation response processing part 110a. The storage part 120 is provided with a setting value storage area 120a and a relay server information storage area 120b. The data reservation part 130 is provided with an image data reservation area 130a, a setting value operation screen data reservation area 130b, and a setting value data reservation area 130c.

The control part 110 is provided with main storage devices that include, for example, a RAM and a ROM, and control devices that include, for example, a CPU (Central Processing Unit). In addition, the control part 110 is expected to comprehensively control the image forming device 100 that also includes various I/O equipment, interfaces such as, for example, an USB (Universal Serial Bus), a bus controller, and other equipment.

The remote operation response processing part 110a is configured to provide a response to a remote operation from the mobile communication terminal 200. The remote operation response processing part 110a will be detailed later.

The storage part 120, which is an auxiliary storage device such as for example a flash memory, is configured to store programs and data that are to be processed when the control part 110 is in execution. It is to be noted that the proxy response mode is stored in the storage part 120.

The setting value data storage area 120a is configured to store currently setting values of the image forming device 100.

The relay server information storage area 120b is configured to store, for example, an IP address of the relay server 300 that is configured to provide a proxy response on behalf of the image forming device 100.

The data reservation part 130 is a hard disk drive that is for storing data and programs.

The image data reservation area 130a is capable of reserving image data that results from causing a manuscript that is read by the manuscript reading part 160 and undergo an image-processing operation at the image processing part 170. In addition, the image data reservation area 130a is also capable of reserving image data that is transmitted and/or received via the network transmission part 190.

The setting value operation screen data reservation area 130b is configured to store data that causes the setting values of the image forming device 100 to display a setting value operation screen for remote operation on the mobile communication terminal 200 and data for operating this setting value operation screen on the mobile communication terminal 200 (hereinafter, the former data and the latter data will be referred to as "setting value operation screen data").

The setting value data reservation area 130c is configured to reserve the setting value data that is stored in the setting value data storage area 120a. Thus, even though contents of the setting value data storage area 120a are disappeared or broken by mistake, it is possible to return the setting value data in the setting value data reservation area 130*c* to the setting value data storage area 120*a*. In addition, the setting value data reservation area 130*c* is a data area that is accessible from the relay server 300 in a direct manner, which makes it possible for the relay server 300 to rewrite the setting value in the setting value data reservation area 130*c* with the changed data and then makes it possible to reflect the rewriting setting value on the setting value data storage area 120*a*.

The operation panel 140, which is in the form of a liquid crystal panel, is configured to display an operation screen and the job execution result, and receive a user's operation.

The operation panel process part 150 is configured to process for displaying operation items that correspond to functions that the image forming device 100 has and the job execution results on the operation panel 140 and otherwise to process for inputting a user's operation from the operation panel 140. Also, the operation panel process part 150 is configured to cause the storage part 120 to store information that the proxy response mode is ON when the operation panel 140 is in use or when an input that is indicative of the proxy response mode being ON is conducted via the operation panel 140, while is configured to cause the storage part 120 to store information that the proxy response mode is OFF when the operation panel 140 is out of use or when an input that is indicative of the proxy response mode being OFF is conducted via the operation panel 140.

The manuscript reading part 160 is configured to read, in response to a manuscript reading operation that is conducted on the operation panel 140 or a manuscript reading demand notification that is received from the mobile communication terminal 200, a manuscript that is placed on a platen of the image forming device 100 and outputs data of reading manuscript data to the image process part 170.

The image process part 170, immediately when the reading manuscript data that the manuscript reading part 160 reads is inputted thereto, causes the image forming device 100 to change the manuscript data into image data that is capable of being processed.

The short-distance radio communication part 180 is configured to establish a direct short-distance communication to the mobile communication terminal 200 via Bluetooth (Registered Trademark) as a short-distance radio communication standard or infrared-ray communication system.

The network communication part 190, which is provided with a detachable LAN interface, is connected to the network 500.

Next, a description will be made as to a functional configuration of the mobile communication terminal 200. The mobile communication terminal 200 that is illustrated in FIG. 2 has a configuration that includes a control part 210, a storage part 220, an operation panel 230, an operation panel process part 240, a short-distance radio communication part 250, and a network communication part 260, which are connected to each other via a bus or the like. The control part 210 is provided with a remote operation demand process part 210*a*. The storage part 220 is provided with a relay server information storage area 220*a* and a setting value operation screen data storage area 220*b*.

The control part 210 is provided with main storage devices that include, for example, a RAM and a ROM, and control devices that include, for example, a CPU (Central Processing Unit). In addition, the control part 210 comprehensively control the mobile communication terminal 200 that also includes various I/O devices, interfaces such as, for example, an USB (Universal Serial Bus), a bus controller, and other equipment.

The remote operation demand process part 210*a* is configured to provide a remote operation process to the image forming device 100. The remote operation demand process part 210*a* will be detailed later.

The storage part 220, which is an auxiliary storage device such as for example a flash memory, is configured to store programs and data that are to be processed when the control part 210 is in execution.

The relay server information storage area 220*a* is configured to store a relay server information that is received from the image forming device 100.

The setting value operation screen data storage area 220*b* is configured to store the setting value operation screen data that is received from the relay server 300.

The operation panel 230, which is in the form of a liquid crystal panel, is configured to display an operation screen and the job execution results, and receive a user's operation.

The operation panel process part 240 is configured to process for displaying operation items that correspond to functions that the mobile communication terminal 200 has and the job execution results and otherwise to process for inputting a user's operation from the operation panel 230.

The short-distance radio communication part 250 is configured to establish a direct short-distance communication to the image forming device 100 via Bluetooth (Registered Trademark) as a short-distance radio communication standard or infrared-ray communication system.

The network communication part 260 is connected, via the access point 400, to the network 500. The network communication part 260 is also connected, via the access point 800, to the Internet protocol network system 700.

Next, a description will be made as to a functional configuration of the relay server 300. The relay server 300 that is illustrated in FIG. 2 has a configuration that includes a control part 310, a storage part 320, and a network communication part 330, which are connected to each other via a bus or the like. The control part 310 is provided with a remote operation proxy response process part 310*a*. The storage part 320 is provided with a setting value operation screen data storage area 320*a*, a rewritten setting value data storage area 320*b*, and a setting value data storage area 320*c*.

The control part 310 is provided with main storage devices that include, for example, a RAM and a ROM, and control devices that include, for example, a CPU (Central Processing Unit). In addition, the control part 310 comprehensively control the relay server 300 that also includes various I/O devices, interfaces such as, for example, an USB (Universal Serial Bus), a bus controller, and other equipment.

The remote operation proxy response processing part 310*a* is configured to provide a response of a remote operation from the mobile communication part 300 on behalf of the image forming device 100 if the proxy response mode of the image forming device is ON. The remote operation proxy response processing part 310*a* will be detailed later.

The storage part 320, which is an auxiliary storage device such as for example a flash memory, is configured to store programs and data that are to be processed when the control part 310 is in execution.

The setting value operation screen data storage area 320*a* is configured to previously store setting value operation screen data of the image forming device 100.

The rewritten setting value data storage area 320b is configured to store a rewritten setting value for the image forming device 100.

The setting value data storage area 320c is configured to store a setting value of the setting value data reservation area 130c that is transmitted from the image forming device 100 in a periodic manner.

The network communication part 330, which is provided with a detachable LAN interface, is for connection with the network 500

Figure 3:
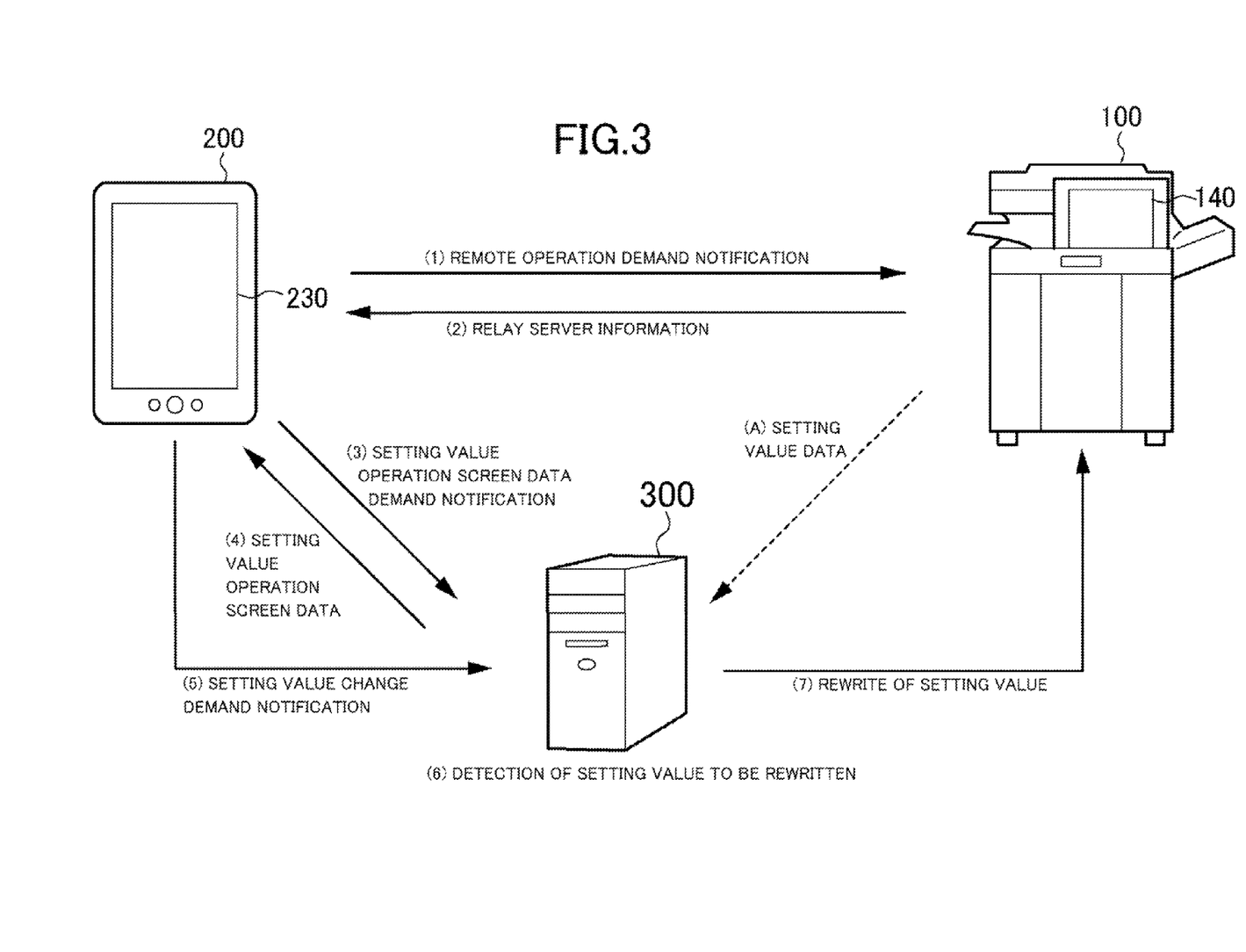
FIG. 3 is a view that illustrates a procedure for changing a setting value of the image forming device from the mobile communication terminal according the exemplary embodiment 1 of the present invention.

Next, with reference to FIG. 3, a description will be made as to how a procedure is performed for changing a setting value of the image forming device 100 from the mobile communication terminal 200 in the first exemplary embodiment.

First of all, when the user requests an operation from a operation panel 230 of the mobile communication terminal 200 to the image forming device 100, the mobile communication terminal 200 transmits a remote operation demand notification to the image forming device 100 as indicated at an item (1).

The image forming device 100 determines whether a proxy response mode is ON and when the proxy response mode is ON, transmits relay server information that includes an IP address of the relay server 300 to the mobile communication terminal 200 as indicated at an item (2). Thereafter, an assumption is made that a communication between the mobile communication terminal 200 and the image forming device 100 is made difficult, while a communication between the mobile communication terminal 200 and the image forming device 100 is established for performing, for example, a job execution.

The mobile communication terminal 200, when determines that the communication to the image forming device 100 is made difficult, transmits a setting value operation screen data demand notification to the relay server 300 whose address is included in the received relay server information as indicated at an item (3). Incidentally, when the proxy response mode is OFF, the image forming device 100 is configured to accept directly an operation form the mobile communication terminal 200 without via the relay server 300 after a recovery of communication between the mobile terminal 200 and the image forming device 100 and therefore steps after the item (2) are not performed.

Next, the relay server 300, when receives the setting value operation screen data demand notification, transmits setting value operation screen data to the mobile communication terminal 200 as indicated at an item (4).

Then, the mobile communication terminal 200, when receives the setting value operation screen data, causes the operation panel 230 to display a setting value operation screen. When the user conducts an operation to change the setting value on the setting value operation screen, the mobile communication terminal 200 transmits a setting value change demand notification that includes the changed setting value to the relay server 300 as indicated at an item (5).

Then, the relay server 300, when receives the setting value change demand notification, compares the changed setting value that is extracted from the setting value change demand notification and the current setting values of the image forming device 100 that the relay server 300 stores to detect a setting value of the image forming device 100 which is to be rewritten as indicated at an item (6). Incidentally, as indicated at an item (A), setting value data that includes currently setting values of the image forming device 100 is transmitted from the image forming device 100 to the relay server 300 in a periodic manner and the relay server 300 causes the setting value data storing area 320c to store the received setting value data.

Then, the relay server 300, as indicated at an item (7), as to the setting value to be rewritten, rewrites the setting value data reservation area 130c of the image forming device 100.

Figure 4:
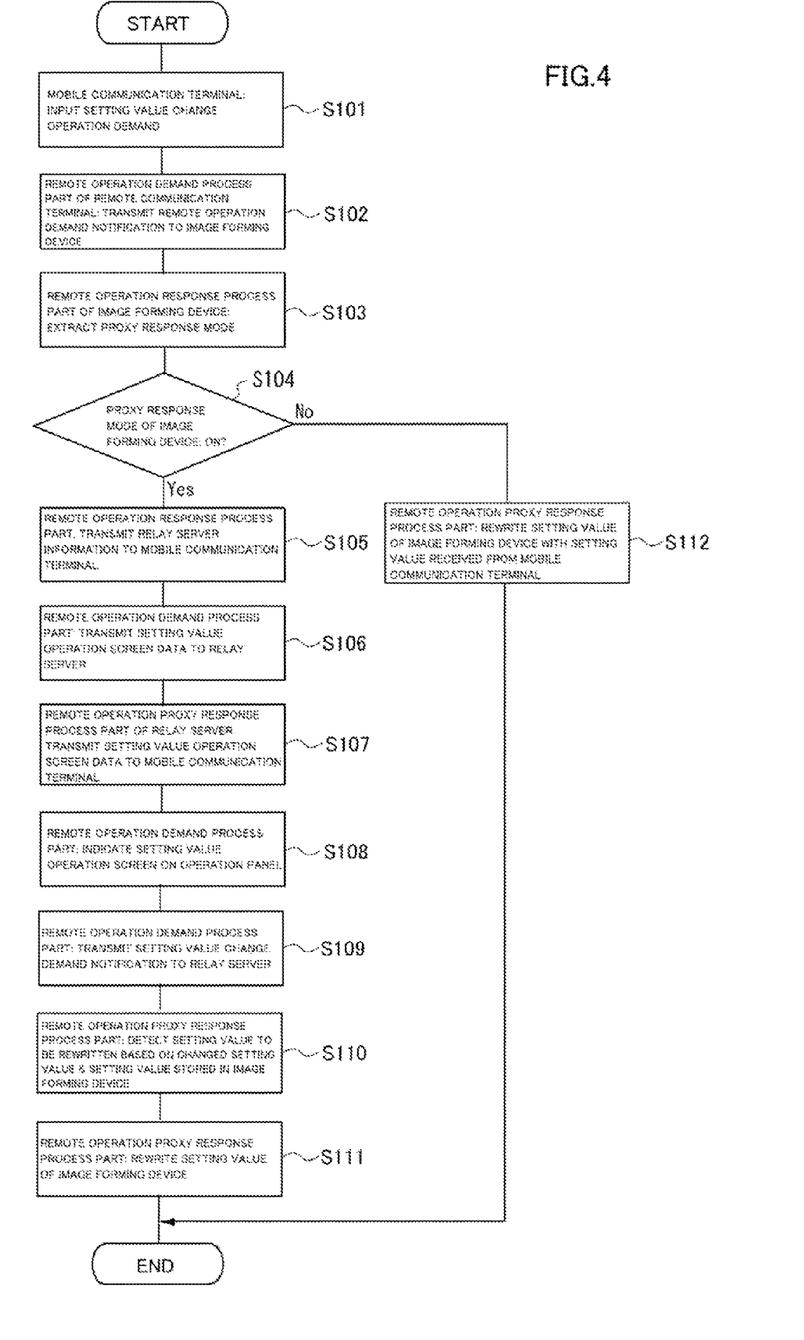
FIG. 4 shows a flowchart that illustrates a detailed procedure for changing a setting value of the image forming device from the mobile communication terminal according the exemplary embodiment 1 of the present invention.

Next, with reference to the flowchart shown in FIG. 4, a detailed description will be made as to how a procedure is performed for changing the setting value of the image forming device 100 from the mobile communication terminal 200.

(Step S101)
First of all, when the user conducts an operation for changing setting value of the image forming device 100 from the operation panel 230 of the mobile communication terminal 200, the operation panel process part 240 is inputted with a setting value change operation demand and outputs the setting value change operation demand to the control part 210.

(Step S102)
Then, the control part 210, when receives the setting value change operation demand, causes the remote operation demand process part 210a to initiate. The remote operation demand process part 210a causes the network communication part 260 to transmit a setting value change operation demand notification to the image forming device 100.

(Step S103)
Then, the control part 110 of the image forming device 100, when receives the setting value change operation demand notification from the network communication part 190, causes the remote operation response process part 110a to initiate. The remote operation response process part 110a extracts a proxy response mode from the storage part 120.

(Step S104)
Then, the remote operation response process part 110a determines whether the proxy response mode is ON. If the proxy response mode in ON (the result of Step S104 is Yes), the control goes to Step S105. If the proxy response mode in OFF (the result of Step S104 is No), the control goes to Step S112.

(Step S105)
In a case where the result of Step S104, the remote operation response process part 110a extracts relay server information from the relay server information storage area 120b and causes the network transmission part 190 to transmit the relay server information to the mobile communication terminal 200.

(Step S106)
Then, the remote operation demand process part 210a, when receives the relay server information via the network communication part 260, causes the relay server information storage area 220a to store the relay sever information and transmits a setting value operation screen data demand notification to the relay server 300 having an IP address that the relay server information includes.

(Step S107)
Then, the relay server 300, when receives the setting value operation screen data demand notification to via the network communication part 330, causes the remote operation proxy response process part 310a to initiate. The remote operation proxy response process part 310a extracts setting value operation screen data from setting value operation screen data storage part 320a and transmits the setting value operation screen data to the mobile terminal 200.

(Step S108)
Then, the remote operation demand process part 210a, when receives the setting value operation screen data via the network communication part 260, causes the operation panel process part 240 to display a setting value operation screen on the operation panel 230.

(Step S109)

Then, the remote operation demand process part 210a, when the user inputs a changed setting value from the setting value operation screen via the operation panel process part 240, transmits a setting value change demand notification that includes the changed setting value to the relay server 300.

(Step S110)

Then, the remote operation proxy response process part 310a, when receives the setting value change demand notification via the network communication part 330, compares the changed setting value that is extracted from the setting value change demand notification and the setting values in the setting value data storage area 320c, detects a setting value to be rewritten of the image forming device 100 and causes the rewritten setting value data storage part 320b to store the resulting setting value.

(Step S111)

Then, the remote operation proxy response process part 310a extracts the setting value to be rewritten from the rewritten setting value data storage part 320b and thereafter rewrite the setting value in the setting value data reservation area 130c of the image forming device 100 to the changed setting value.

(Step S112)

In a case where the result of Step S104 is No, after the communication recovers between the mobile communication terminal 200 and the image forming device 100, the remote operation response process part 110a receives the setting value to be rewritten by the mobile communication terminal 200 via the network 190 in a direct manner and rewrites the setting value of the setting value data reservation part 130c.

According to the aforementioned exemplary embodiment 1, when the proxy response mode of the image forming device 100 is ON, the changed setting value is transmitted from the mobile communication terminal 200 to the relay server 300, rewrites the setting value of the image forming device 100 directly and therefore the mobile communication terminal 200 is allowed to terminate operation of the setting value when, for example, a continual communication between the mobile communication terminal 200 and the image forming device 100 becomes difficult, which makes it possible to enhance the user convenience.

Next, an exemplary embodiment 2 for carrying out the present invention will be described with reference to the attached drawings.

In the exemplary embodiment 2, in a case where an alert mode is in a set condition (non-rewritable condition) that is caused an occurrence of a condition (hereinafter, which will be referred to as an "alert condition"), such as, during a rebooting, a high load condition or an under-maintenance condition of the image forming device, which is different from a normal condition, the relay server extract all the setting value data from the image forming device. In addition, when the alert mode is released (rewritable condition is established), the relay server overwrites the set data of the image forming device. It is to be noted that a proxy response mode is identical with that of the exemplary embodiment 1. The alert mode causes the image forming device to set automatically when the image forming device is brought into the alert condition, while causes the image forming device to reset automatically when the image forming device is brought out of the alert condition. In addition, when the alert mode is switched from the released condition to the set condition or when the alert mode is switched from the set condition to the released condition, information that indicates of the set condition or the released condition of the alert mode is transmitted from the image forming device to the relay server.

A system configuration of an image forming system of the exemplary embodiment 2 is identical with the system configuration of the image forming device of the exemplary embodiment 1 which is shown in FIG. 1. In addition, functional configurations of an image forming device, a mobile communication terminal, and a relay server are identical with the functional configurations of the image forming device 100, the mobile communication terminal 200, and the relay server 300, which is shown in FIG. 2 respectively.

Figure 5:
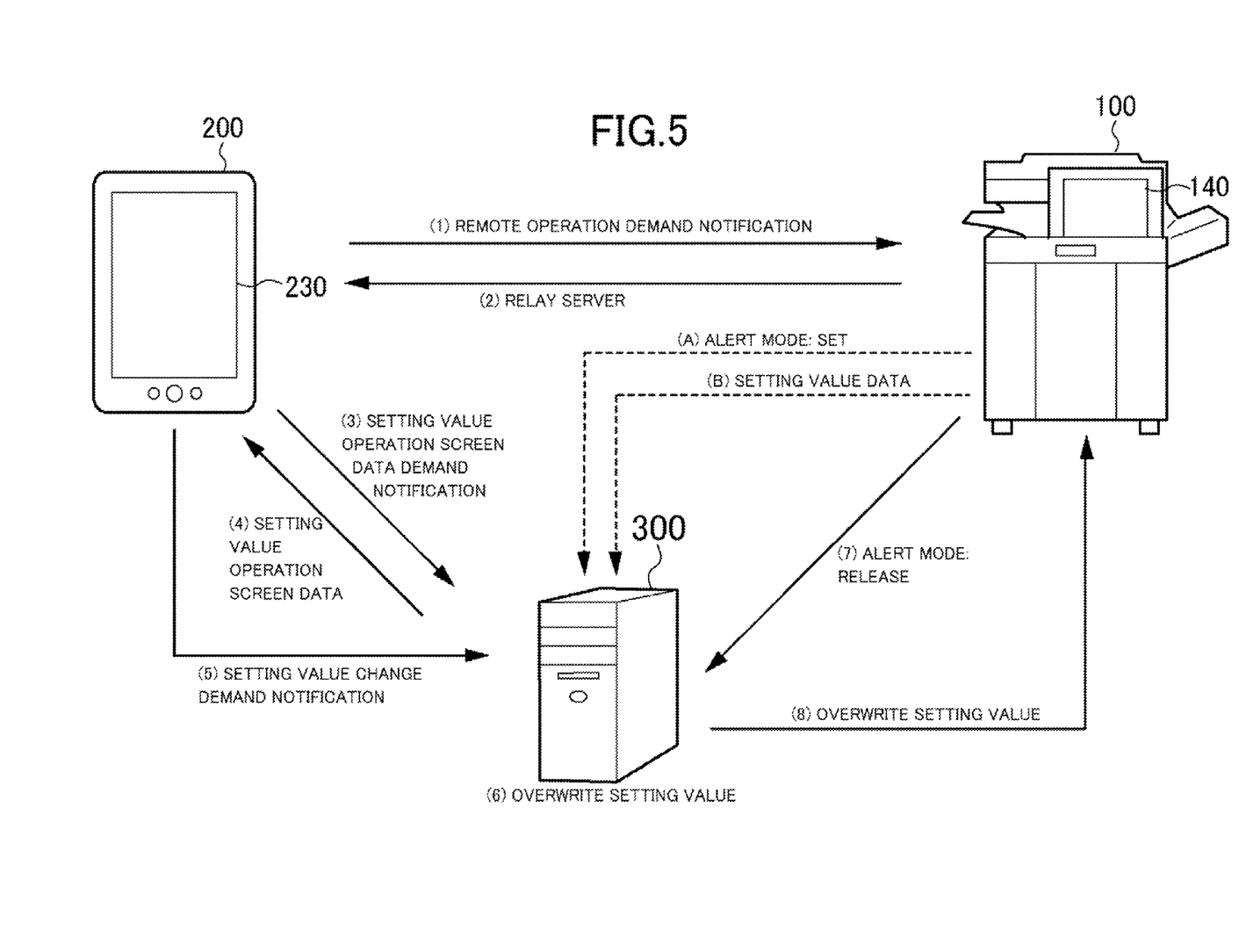
FIG. 5 is a view that illustrates a procedure for changing a setting value of the image forming device from the mobile communication terminal according the exemplary embodiment 2 of the present invention.

Next, with reference to FIG. 5, a description is made as to how to change setting value of the image forming device 100 from the mobile terminal 200 in the exemplary embodiment 2. When how to change setting value of the image forming device 100 from the mobile terminal 200 in the exemplary embodiment 2 which is shown in FIG. 5 is different from that of the exemplary embodiment 1 which is shown FIG. 3, only the different portion will be described.

The relay server 300, when receives an alert mode setting from the image forming device 100 as indicated at an item (A), extracts the setting value data from the setting value data reservation area 130c of the image forming device 100 as indicated at an item (B) to store the same in the setting value data storage area 320c. The exemplary embodiment 2, in which the relay server 300 extracts the setting value data of the image forming device 100 when the relay server 300 receives the alert mode setting from the image forming device 100, is not configured to transmit the setting value data in a periodic manner from the image forming device 100 to the relay server 300.

Subsequent to the procedure at the item (5), the relay server 300, as indicated at an item (6), overwrites the setting value data in the setting value data storage area 320c in which all the setting values are stored that the relay server 300 extracts from the image forming device 100 with the changed setting value that is extracted from the setting value change request notification.

Then, the relay server 300, as indicated at an item (7), receives a signal that renders the alert mode released.

Then, the relay sever 300, as indicated at an item (8), overwrites the setting value data in the image forming device 100 with the setting value data in the setting value data storage area 320c.

According to the aforementioned exemplary embodiment 2, the relay server 300, when receives, from the image forming device 100, the signal that renders the alert mode set, extracts the setting value that is in currently use (the latest setting value) in the image forming device 100 to store. Also, the relay server 300, when receives, from the mobile communication terminal 200, the setting value change request notification, is capable of overwriting the latest setting value of the image forming device 100 that the relay server 300 stores with the changed setting value that is extracted from the setting value change request notification. In addition, when the alert mode of the image forming device 100 is being released, the relay server 300 is capable of overwriting, in a direct manner, the setting value data of the image forming device 100 with the setting value that the relay server 300 stores. Thereby, the mobile communication terminal 200 is allowed to terminate the setting value operation even while the image forming device 100 is in the alert condition, which will enhance convenience for users.

It is to be noted that in the exemplary embodiment 1 and the exemplary embodiment 2, the operation procedure and the process procedure are made as to the image forming device 100, the mobile communication terminal 200, and the relay server 300 each of which is singularly prepared, however in a case where there are plurality of the image forming devices 100, the mobile communication terminals 200, and the relay servers 300, operation procedure and process procedure in such a case may be performed, similar to the preceding operation procedure and process procedure for the image forming device 100, the mobile communication terminal 200, and the relay server 300 each of which is singularly prepared, by setting an address destination when a data transmission is made between the devices.

In addition, in the exemplary embodiment 1 and the exemplary embodiment 2, the image forming device 100 and the mobile communication terminal 200 are connected with each other via the network 500 such that the network 500 allows for data transmitting and receiving data between the mobile communication terminal 200, but not limited thereto. For example, it may be possible to transmit and receive data between the mobile communication terminal 200 and the image forming device 100 in terms of a short distance wireless communication between the mobile communication terminal 200 and the image forming device 100, by the short distance wireless communication being established by the short distant wireless communication part 180 of the image forming device 100 and the short distant wireless communication part 250 of the mobile communication terminal 200. In addition, in a case where the image forming device 100, the mobile communication terminal 200, and the relay server 300 are connected to the Internet 700, it may be also possible to transmit and receive data, using the communication protocol of the Internet 700, among the image forming device 100, the mobile communication terminal 200, and the relay server 300.

Further, in the exemplary embodiment 1 and the exemplary embodiment 2, the authentication data such as the password for accessing the rely server 300 is stored in the relay server information that comes from the image forming device 100, which allows the mobile communication terminal 200, using the authentication data, access the relay server 300. Thereby, it is possible to prevent an illegal access to the relay server 300 and also to possible to prevent an illegal operation, such as a rewriting of the setting value, to the image forming device 100.

Moreover, in the exemplary embodiment 1 and the exemplary embodiment 2, the setting value operation screen demand notification is transmitted from the mobile communication terminal 200 to the relay server 300 and the setting value operation screen data comes from the relay server 300, but not limited thereto. For example, it may be also possible to configure that the mobile communication terminal 200 transmits the remote operation request notification to the image forming device 100 and the image forming device 100, when transmits the relay server information to the mobile communication terminal 200, transmits the setting value operation screen data to the mobile communication terminal 200.

The aforementioned image forming system, image forming device, mobile communication terminal, and relay server make it possible to allow the mobile communication device to operate the image forming device in a remote manner without having to confirm the image forming device from the mobile communication terminal.

As apparent from the above, though the present invention has been described in terms of the detailed exemplary embodiments, the aforementioned exemplary embodiments are mere illustrative and therefore it is apparent that the present invention is not limited to these exemplary embodiments.

INDUSTRIAL APPLICABILITY

The image forming system, image forming device, mobile communication terminal, and relay server according to the present invention are applicable to any system and device that are controllable in a remote manner.

The invention claimed is:

1. An image forming system, comprising:
a mobile communication terminal;
an image forming device; and
a relay server,
the mobile communication terminal including a remote operation demand notification transmission part that is configured to transmit a remote operation demand notification to the image forming device, a relay server information receiving part that is configured to receive relay information in which an address of the relay server is stored from the image forming device, and a setting value change demand notification transmission part that is configured to transmit a setting value change demand notification including a changed setting value to the relay server,
the image forming device including a setting value data transmission part that is configured to transmit setting value data including a setting value of the image forming device to the relay server, a remote operation demand notification receiving part that is configured to receive the remote operation demand notification from the mobile communication terminal, and a relay server information transmission part that is configured to transmit the relay server information to the mobile communication terminal,
the relay server including a setting value data receiving part that is configured to receive the setting value data from the image forming device, a setting value change demand notification part that is configured to receive the setting value change demand notification, a rewritten setting value detection part that is configured to detect a rewritten setting value based on the setting value data and the changed setting value, and a setting value rewriting part that is configured to rewrite a setting value of the image forming apparatus based on the rewritten setting value, the relay server causing the setting value rewriting part to rewrite the setting value of the image forming device.

2. The image forming system according the claim 1, wherein the image forming device further includes a proxy response setting part that is configured to cause a proxy response mode to be either ON or OFF, and the setting value rewriting part of the relay server rewrites the setting value of the image forming device when the proxy response mode is ON.

3. The image forming system according to claim 2, wherein the proxy response mode is ON when an operation panel of the image forming device is in use, while the proxy response mode is OFF when the operation panel of the image forming device is out of use.

4. The image forming system according the claim 1, wherein the mobile communication terminal includes a setting value operation screen data demand notification transmission part that is configured to transmit a setting value operation screen data demand notification to the relay server, a setting value operation screen data receiving part that is configured to receive setting value operation screen data from the relay server, and a setting value operation screen display part that is configured to display a setting value operation screen based on the setting value data operation screen data, and the relay server includes a setting value operation screen data demand notification receiving part that is configured to receive a setting value operation screen data demand notification from the mobile communication terminal and a setting value operation screen data demand transmission part that is configured to transmit the setting value operation screen data to the mobile communication terminal.

5. An image forming system, comprising:

a mobile communication terminal;

an image forming device; and a relay server, the mobile communication terminal including a remote operation demand notification transmission part that is configured to transmit a remote operation demand notification to the image forming device, a relay server information receiving part that is configured to receive relay information in which an address of the relay server is stored from the image forming device, and a setting value change demand notification transmission part that is configured to transmit a setting value change demand notification including a changed setting value to the relay server, the image forming device including a remote operation demand notification receiving portion that is configured to receive the remote operation demand notification from the mobile communication terminal, a relay server information transmission part that is configured to transmit the relay server information to the mobile communication terminal, an alert mode setting transmission part that is configured to transmit a signal for setting an alert mode to the relay server, and an alert mode resetting transmission part that is configured to transmit a signal for resetting the alert mode, the relay server including an alert mode setting receiving part that is configured to receive the signal for setting an alert mode from the image forming device, a setting value data extracting part that is configured to extract, when the alert mode set receiving part receives the signal for setting the alert mode, extract setting value data in which a setting value is stored from the image forming device, a setting value change demand notification receiving part that is configured to receive the setting value change demand notification from the mobile communication terminal, a setting value overriding part that is configured to override the changed setting value to the setting value data that is extracted by the setting value data extracting part, an alert mode reset receiving part that is configured to receive the signal for resetting the alert mode from the image forming device, and an image forming device setting value overriding part that is configured to override the setting value data that is overridden by the setting value overriding part to the setting value data of the image forming device, the relay server causing the setting value overriding part to override the setting value of the image forming device when the alert mode receiving part receives the signal for resetting the alert mode.

6. The image forming system according the claim 5, wherein the image forming device includes a proxy response setting part that is configured to cause a proxy response mode to be either ON or OFF, and the setting value overriding part of the relay server overrides the setting value data of the image forming device when the proxy response mode is ON.

\* \* \* \* \*